(12) United States Patent
Yamamoto et al.

(10) Patent No.: US 11,716,586 B2
(45) Date of Patent: Aug. 1, 2023

(54) INFORMATION PROCESSING DEVICE, METHOD, AND PROGRAM

(71) Applicant: Sony Corporation, Tokyo (JP)

(72) Inventors: Yuki Yamamoto, Tokyo (JP); Toru Chinen, Kanagawa (JP); Minoru Tsuji, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/278,178

(22) PCT Filed: Sep. 13, 2019

(86) PCT No.: PCT/JP2019/036032
§ 371 (c)(1),
(2) Date: Mar. 19, 2021

(87) PCT Pub. No.: WO2020/066681
PCT Pub. Date: Apr. 2, 2020

(65) Prior Publication Data
US 2022/0116732 A1    Apr. 14, 2022

(30) Foreign Application Priority Data

Sep. 28, 2018    (JP) ................ 2018-184161

(51) Int. Cl.
*H04S 7/00*        (2006.01)
*G06N 20/20*      (2019.01)
*G10L 19/008*    (2013.01)

(52) U.S. Cl.
CPC ............ *H04S 7/305* (2013.01); *G06N 20/20* (2019.01); *G10L 19/008* (2013.01); *H04S 2400/11* (2013.01)

(58) Field of Classification Search
CPC ........ H04S 7/305; H04S 7/00; H04S 2400/11; G10L 19/008; G06N 20/20
See application file for complete search history.

(56) References Cited

U.S. PATENT DOCUMENTS

2006/0294093 A1* 12/2006 Yamamoto ............. H04N 5/782
707/999.005
2010/0318911 A1    12/2010 Holladay et al.
(Continued)

FOREIGN PATENT DOCUMENTS

| CN | 103650539 A | 3/2014 |
| CN | 104969576 A | 10/2015 |

(Continued)

OTHER PUBLICATIONS

International Search Report and English translation thereof dated Nov. 12, 2019 in connection with International Application No. PCT/JP2019/036032.
(Continued)

*Primary Examiner* — Yogeshkumar Patel
(74) *Attorney, Agent, or Firm* — Wolf, Greenfield & Sacks, P.C.

(57) ABSTRACT

The present technology relates to an information processing device, a method, and a program that enable easy production of 3D Audio content.
The information processing device includes a determination unit that determines one or more parameters constituting the metadata of an object on the basis of one or more pieces of attribute information of the object. The present technology can be applied to information processing devices.

17 Claims, 6 Drawing Sheets

(56) References Cited

U.S. PATENT DOCUMENTS

| | | | |
|---|---|---|---|
| 2011/0283865 A1* | 11/2011 | Collins | G06F 3/16 |
| | | | 84/464 R |
| 2013/0202129 A1* | 8/2013 | Kraemer | H04S 7/308 |
| | | | 704/500 |
| 2014/0286506 A1 | 9/2014 | Kamiya | |
| 2015/0245153 A1* | 8/2015 | Malak | H04S 7/30 |
| | | | 381/57 |
| 2017/0086008 A1 | 3/2017 | Robinson | |
| 2017/0098452 A1 | 4/2017 | Tracey | |
| 2018/0098173 A1 | 4/2018 | Van Brandenburg | |
| 2018/0160250 A1* | 6/2018 | Yamamoto | H04S 7/303 |
| 2018/0359586 A1* | 12/2018 | Chon | H04S 5/005 |
| 2019/0373391 A1* | 12/2019 | Han | H04N 21/21805 |
| 2021/0005211 A1* | 1/2021 | Stahlmann | G10L 19/167 |
| 2021/0118466 A1* | 4/2021 | Yamamoto | G10L 19/008 |
| 2021/0235192 A1* | 7/2021 | Healy | H04R 1/028 |

FOREIGN PATENT DOCUMENTS

| | | |
|---|---|---|
| CN | 108141665 A | 6/2018 |
| EP | 2784955 A2 | 10/2014 |
| JP | 2000-047681 A | 2/2000 |
| JP | 2014-187638 A | 10/2014 |

OTHER PUBLICATIONS

International Written Opinion and English translation thereof dated Nov. 12, 2019 in connection with International Application No. PCT/JP2019/036032.

International Preliminary Report on Patentability and English translation thereof dated Apr. 8, 2021 in connection with International Application No. PCT/JP2019/036032.

* cited by examiner

INFORMATION PROCESSING DEVICE, METHOD, AND PROGRAM

CROSS-REFERENCE TO RELATED APPLICATIONS

This application claims the benefit under 35 U.S.C. § 371 as a U.S. National Stage Entry of International Application No. PCT/JP2019/036032, filed in the Japanese Patent Office as a Receiving Office on Sep. 13, 2019, which claims priority to Japanese Patent Application Number JP2018-184161, filed in the Japanese Patent Office on Sep. 28, 2018, each of which is hereby incorporated by reference in its entirety.

TECHNICAL FIELD

The present technology relates to information processing devices, methods, and programs, and in particular, to information processing devices, methods, and programs that enable easy production of 3D Audio content.

BACKGROUND ART

Conventionally, the Moving Picture Experts Group (MPEG)-H 3D Audio standard is known (see, for example, Non-Patent Document 1 and Non-Patent Document 2).

3D Audio, which is handled by the MPEG-H 3D Audio standard and the like, can reproduce the direction, distance, and spread of three-dimensional sound, making it possible to reproduce audio with a more realistic feeling than conventional stereo playback.

CITATION LIST

Non-Patent Document

Non-Patent Document 1: ISO/IEC 23008-3, MPEG-H 3D Audio
Non-Patent Document 2: ISO/IEC 23008-3: 2015/AMENDMENT3, MPEG-H 3D Audio Phase 2

SUMMARY OF THE INVENTION

Problems to be Solved by the Invention

However, with 3D Audio, a temporal cost for producing content (3D Audio content) increases.

For example, in 3D Audio, the position information of the object, that is, the position information of the sound source, has a higher number of dimensions than stereo (3D Audio is three-dimensional and stereo is two-dimensional). Therefore, 3D Audio increases a temporal cost, especially in determining parameters that constitute metadata for each object, such as a horizontal angle, a vertical angle, and a distance that indicate a position of the object, and a gain for the object.

In addition, in 3D Audio content, both the number of contents and the number of producers are overwhelmingly smaller than those in stereo content. Therefore, the current situation is that there are few high-quality 3D Audio contents.

From the above, it is desired to make it possible to produce sufficiently high-quality 3D Audio contents more easily, that is, in a shorter time.

The present technology has been made in view of such a situation, and enables easy production of 3D Audio contents.

Solutions to Problems

The information processing device of one aspect of the present technology includes a determination unit that determines one or more parameters constituting metadata of an object on the basis of one or more pieces of attribute information of the object.

An information processing method or program of one aspect of the present technology includes a step of determining one or more parameters constituting metadata of an object on the basis of one or more pieces of attribute information of the object.

In one aspect of the present technology, one or more parameters that constitute metadata of an object are determined on the basis of one or more pieces of attribute information of the object.

MODE FOR CARRYING OUT THE INVENTION

Hereinafter, embodiments to which the present technology is applied will be described with reference to the drawings.

First Embodiment

<About Present Technology>

The present technology makes it possible to produce sufficiently high-quality 3D Audio contents more easily, that is, in a shorter time by determining metadata, more specifically, one or more parameters that constitute the metadata for each object.

In particular, the present technology has the following features (F1) to (F5).

Feature (F1): Determine metadata from information given to each object
Feature (F2): Determine metadata from an audio signal for each object
Feature (F3): Determine metadata from another piece of information
Feature (F4): Modify the metadata to get a desired distribution
Feature (F5): A plurality of metadata determination patterns exists With the present technology, high-quality 3D Audio content can be produced in a short time by determining the metadata of the object from the information shown below. With this arrangement, it is expected that the number of high-quality 3D Audio contents and the number of producers of 3D Audio content increase.

Hereinafter, a specific example of determining object metadata will be described for each type of information used for automatic calculation (automatic determination) of the object metadata.

Note that, in the present technology, the object may be any object such as an audio object or an image object as long as it has parameters such as position information and gain as metadata.

For example, the present technology is also applicable to a case where a parameter indicating a position of an image object such as a 3D model in space is used as metadata, and metadata of the image object is determined on the basis of attribute information indicating an attribute of the image object. Note that, the attribute information of the image object can be a type (kind), a priority, or the like of the image object.

In the following, a case where the object is an audio object will be described as an example.

In a case where the object is an audio object, the metadata includes one or more parameters (information) used for processing for reproducing sound based on an audio signal of the object, more specifically, processing for rendering the object.

Specifically, the metadata includes, for example, a horizontal angle, a vertical angle, and a distance that constitute position information indicating the position of the object in three-dimensional space, and a gain of the audio signal of the object. Note that, in the following, an example in which the metadata includes a total of four parameters of a horizontal angle, a vertical angle, a distance, and a gain will be described, but the number of metadata parameters may be any number as long as it is one or more.

The horizontal angle is an angle indicating a horizontal position of the object as viewed from a predetermined reference position such as a user's position, and the vertical angle is an angle indicating a vertical position of the object as viewed from the reference position. Also, the distance constituting the position information is a distance from the reference position to the object.

(Determination from information given to each object)

First, a method of determining metadata, more specifically, parameters of the metadata, from information given to each object will be described.

Object metadata is often determined on the basis of information regarding object attributes, such as musical instrument information, acoustic effect information, and priority information. However, the rules for determining metadata according to these musical instrument information and the like differ depending on the producer of 3D Audio content.

The musical instrument information is information that indicates what kind of object (sound source) is, such as a vocal "vocal," drum "drums," bass "bass," guitar "guitar," and piano "piano." That is, it is information indicating a sound source kind. More specifically, the musical instrument information is information indicating a kind of the object such as a musical instrument, a voice part, and a gender of the voice such as a man or a woman, that is, the attribute of the object itself to be a sound source.

For example, in a case of a certain producer, for an object whose musical instrument information is "vocal," the horizontal angle that constitutes the metadata is often set to zero degrees (0°), and the gain tends to be set to a value larger than 1.0. Further, for example, in the case of a certain producer, for an object whose musical instrument information is "bass," the vertical angle that constitutes the metadata is often set to a negative value.

In this way, for the individual producer of 3D Audio content, values of the parameters that constitute the metadata for musical instrument information and a range that the values of the parameters that constitute the metadata can take may be determined to some extent in advance. In such a case, it is possible to determine the metadata of the object from the musical instrument information.

Further, the acoustic effect information is information indicating an acoustic effect, such as an effect added to the audio signal of the object, that is, applied to the audio signal. In other words, the acoustic effect information is information indicating attributes related to the acoustic effect of the object. In particular, here, among the acoustic effect information indicating the acoustic effect, a reverberation effect as the acoustic effect, that is, the one showing the reverberation characteristic is referred to as the reverberation information, and the one showing the acoustic effect other than the reverberation effect is referred to as the acoustic information.

The reverberation information is information indicating the reverberation effect added (given) to the audio signal of the object, that is, the reverberation characteristic of the audio signal, such as dry "dry," short reverb "short reverb," and long reverb "long reverb." Note that, for example, "dry" indicates that no reverberation effect is applied to the audio signal.

For example, in the case of a certain producer, for an object whose reverberation information is "dry," the horizontal angle that constitutes the metadata is often set to a value in the range of −90 degrees to 90 degrees, and for an object whose reverberation information is "long reverb," the vertical angle that constitutes the metadata is often set to a positive value.

In this way, also for the reverberation information, as with the musical instrument information, values of the parameters of the metadata and a range that the values of the parameters of the metadata can take may be determined for the reverberation information to some extent for each producer in advance. Therefore, it is possible to determine the metadata using reverberation information as well.

Further, the acoustic information is information indicating an acoustic effect other than the reverberation added (given) to the audio signal of the object, such as natural "natural" and distortion "dist." Note that, "natural" indicates that no effect is applied particularly to the audio signal.

For example, in the case of a certain producer, for an object whose acoustic information is "natural," the horizontal angle that constitutes the metadata is often set to a value in the range of −90 degrees to 90 degrees, and for an object whose acoustic information is "dist," the vertical angle that constitutes the metadata is often set to a positive value. Therefore, it is possible to determine the metadata using acoustic information as well.

Further, the priority information is information indicating the priority of the object. For example, the priority information is set to any value from 0 to 7, and the larger the value, the higher the priority of the object. It can be said that such a priority is also information indicating the attribute of the object.

For example, in the case of a certain producer, for an object whose priority information value is less than six, the horizontal angle that constitutes the metadata is often set to a value outside the range of −30 degrees to 30 degrees, and the vertical angle tends to be set to not less than zero degrees unless the value of the priority information is six or more. Therefore, it is possible to determine the metadata using priority information as well.

By using the musical instrument information, the reverberation information, the acoustic information, and the priority information in this way, it is possible to determine the metadata of the object for each producer.

In addition to this, in a case where an object is recorded on the premise of a certain speaker arrangement, that is, a certain channel configuration, the metadata is often determined on the basis of channel information of the object.

Here, the channel information is information indicating the attributes related to a channel corresponding to a speaker to which an audio signal of an object is supplied, such as L, R of stereo (stereo) and C, L, R, Ls, Rs of 5.1 channel (5.1ch), that is, a channel of the object.

For example, in the case of a certain producer, for an R channel object whose channel information is "stereo R" and an L channel object whose channel information is "stereo L," the horizontal angles constituting the metadata of the L channel and R channel have a positive-negative inversion relationship, and the vertical angles are often set to the same angle.

Also, for example, for an Ls channel object whose channel information is "5.1 channel Ls" and an Rs channel object whose channel information is "5.1 channel Rs," the horizontal angles constituting the metadata of the Ls channel and Rs channel have a positive-negative inversion relationship, and the vertical angles are often set to the same angle.

From these facts, it can be seen that the metadata can be determined also by using the channel information.

In the present technology, the metadata of each object, more specifically, the parameters constituting the metadata are determined on the basis of at least one of musical instrument information, reverberation information, acoustic information, priority information, and channel information.

Specifically, in the present technology, the metadata is determined by using, for example, a decision tree which is a supervised learning method.

In the decision tree, the musical instrument information, reverberation information, acoustic information, priority information, and channel information for each object collected in advance for a plurality of 3D Audio contents, and the metadata parameter values are used as data for learning (learning data).

Then, a decision tree model is learned in which musical instrument information, reverberation information, acoustic information, priority information, and channel information are input and metadata is output. By using the decision tree model obtained in this way, it is possible to easily determine (predict) the metadata of each object.

Figure 1:
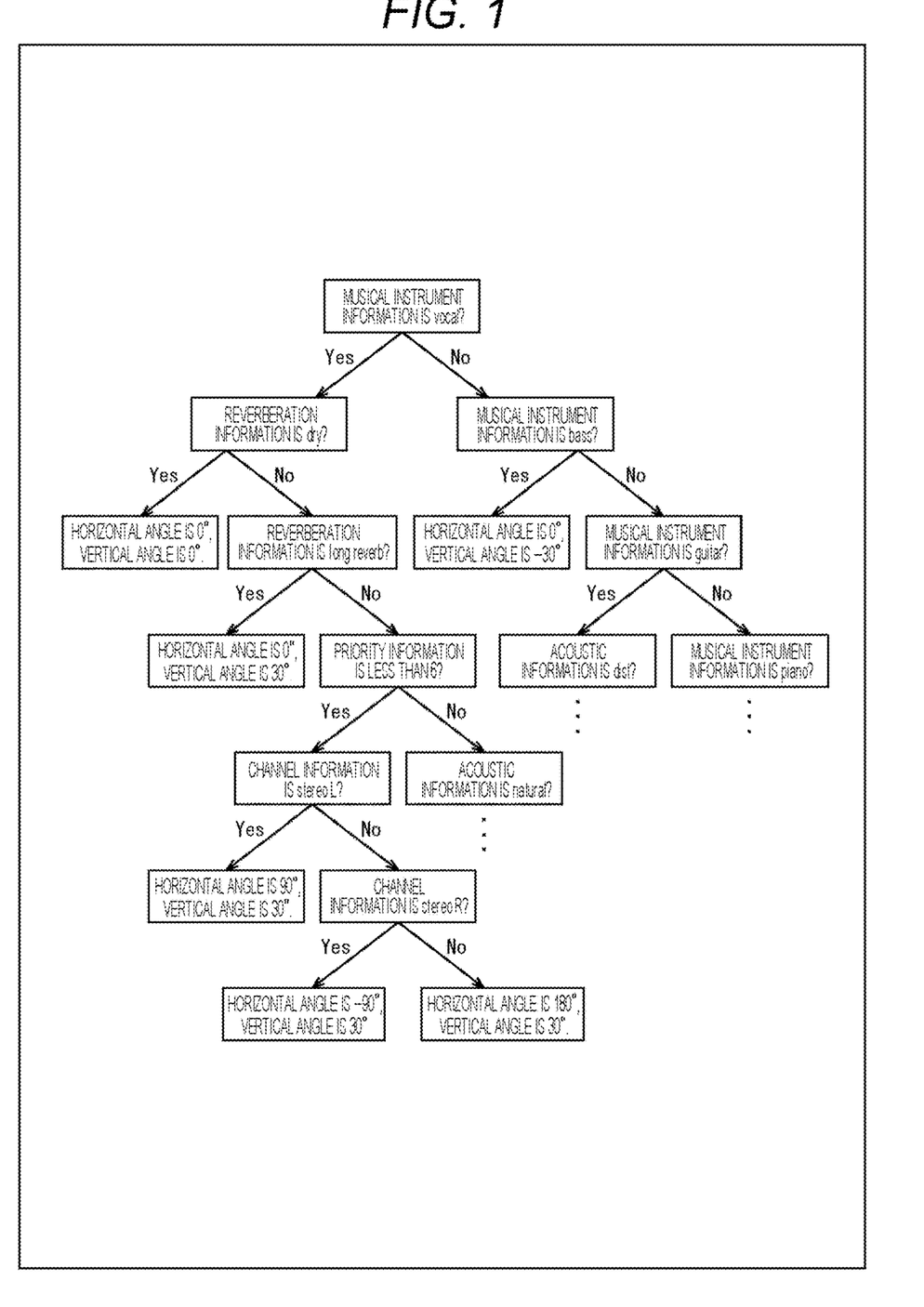
FIG. 1 is a diagram for explaining determination of metadata by a decision tree.

Here, FIG. 1 shows an example of a decision tree that determines the horizontal and vertical angles that constitute the metadata.

In the example shown in FIG. 1, it is first determined whether or not the musical instrument information is "vocal" for each object in the decision tree.

In a case where it is determined that the musical instrument information is "vocal," it is then determined whether or not the "reverberation information" is "dry." At this time, in a case where it is determined that the "reverberation information" is "dry," the horizontal angle of the object is determined to be zero degrees and the vertical angle is determined to be zero degrees, and the processing of the decision tree terminates.

On the other hand, in a case where it is determined that the reverberation information is not "dry," it is determined whether or not the reverberation information is "long reverb." Then, in a case where it is determined that the reverberation information is "long reverb," the horizontal angle of the object is determined to be zero degrees and the vertical angle is determined to be 30 degrees, and the processing of the decision tree terminates.

In this way, in the decision tree, the determination is continuously performed up to the termination of the decision tree according to the result of the determination based on each type of information such as musical instrument information, reverberation information, acoustic information, priority information, and channel information, and final horizontal angle and vertical angle are determined.

Using such a decision tree, it is possible to determine the horizontal and vertical angles that constitute the metadata for each object from the information given to each object, such as musical instrument information, reverberation information, acoustic information, priority information, and channel information.

Note that, the metadata determination method is not limited to the decision tree, and may be other supervised learning methods such as linear determination, support vector machine, and neural network.

(Determination from Audio Signal for Each Object)

Next, a method of determining metadata from the audio signal of each object will be described.

For example, the metadata of an object may be determined on the basis of information such as sound pressure (sound pressure information) and pitch (pitch information) obtained from the audio signal of the object. Since these pieces of information such as sound pressure and pitch (pitch) represent the characteristics of the sound of an object, it can also be said to be information indicating the attributes of the object.

Specifically, for example, in the case of a certain producer, the higher the sound pressure of the audio signal, the closer the vertical angle that constitutes the metadata is to zero degrees, and the higher the sound pressure, the gain that constitutes the metadata is often set to a value less than 1.0.

Further, for example, in the case of a certain producer, when the audio signal is a low-pitched signal, the vertical angle constituting the metadata tends to be set to a negative value, and conversely, when the audio signal is a high-pitched signal, the vertical angle tends to be set to a positive value.

Therefore, by adding these pieces of information related to the sound pressure and the pitch to the input of the method for determining the metadata from the information given for each object (hereinafter, also referred to as metadata determination method), it is possible to improve the determination accuracy of the metadata.

Specifically, for example, for sound pressure and pitch, it is sufficient that the feature amount calculated by the method described below is added to the input of the above-mentioned metadata determination method, that is, the input of the decision tree or the like.

For example, for sound pressure, it is sufficient that the feature amount level (i_obj) calculated by the following formula (1) is used as one of the inputs of the metadata determination method.

[Formula 1]

$$\text{level (i\_obj)} = 20 \times \log_{10}\left(\frac{\sum_{i\_sample=1}^{n\_sample} pcm^2(i\_obj, i\_sample)}{n\_sample} + 2^{-23}\right) \quad (1)$$

Note that, in formula (1), i_obj indicates the index of the object, and i_sample indicates the index of an audio signal sample.

Also, in formula (1), pcm (i_obj, i_sample) indicates the sample value of a sample whose index is i_sample in the audio signal of the object whose index is i_obj, and n_sample indicates the total number of samples of the audio signal.

Further, for the pitch (pitch), for example, it is sufficient that the feature amount level_sub (i_obj, i_band) calculated by the following formula (2) is used as one of the inputs of the metadata determination method.

[Formula 2]

$$\text{level\_sub}(i\_obj, i\_band) = \qquad (2)$$
$$20 \times \log_{10}\left(\frac{\sum_{i\_sample=1}^{n\_sample} \text{pcm\_sub}^2(i\_obj, i\_band, i\_sample)}{n\_sample} + 2^{-23}\right).$$

Note that, in formula (2), the index i_obj, index i_sample, and n_sample are the same as in formula (1), and i_band is an index indicating the band.

For example, by performing filtering processing on the audio signal with a bandpass filter, the audio signal of each object is divided into audio signals in three bands of 0 kHz to 2 kHz, 2 kHz to 8 kHz, and 8 kHz to 15 kHz. Further, here, the audio signal of each band is represented as pcm_sub (i_obj, i_band, i_sample).

Further, the index i_band=1 indicates a band of 0 kHz to 2 kHz, index i_band=2 indicates a band of 2 kHz to 8 kHz, and index i_band=3 indicates a band of 8 kHz to 15 kHz.

In such a case, the feature amount level_sub (i_obj, 1), feature amount level_sub (i_obj, 2), and feature amount level_sub (i_obj, 3) are obtained by formula (2) and used as the input of the metadata determination method.

(Determination from Another Piece of Information)

Further, a method of determining metadata from another piece of information will be described.

For example, metadata of the object may be determined on the basis of respective pieces of information, such as the number of objects in 3D Audio content, the metadata of other objects, object names, and the genre of 3D Audio content constituted by objects. Therefore, by adding the respective pieces of information described above also to the input of the metadata determination method, it is possible to improve the determination accuracy.

Since the object name often contains information that is a substitute for the musical instrument information or channel information, such as an instrument name of the object or the corresponding channel, that is, information indicating the attribute of the object, it can be used for determining the metadata.

Further, information indicating the genre of 3D Audio content such as music such as jazz, the number of objects which is the total number of objects constituting the 3D Audio content, and the like are information indicating the attributes of the content constituted by the objects. Therefore, information regarding the attributes of the content, such as the genre and the number of objects, can also be used to determine the metadata as object attribute information.

For example, in the case of a certain producer, if the number of objects (the number of objects) arranged in space is large, each object is often arranged at unequal intervals in the space, and conversely, if the number of objects is small, each object is often arranged at equal intervals.

Therefore, for example, the number of objects constituting the 3D Audio content can be added as one of the inputs of the metadata determination method. In this case, for example, the horizontal angle, vertical angle, and distance constituting the metadata are determined so that the objects are arranged at equal or unequal intervals in the space.

Further, for example, in the case of a certain producer, it is often the case that another object is not arranged at the same position as the object whose position in the space has already been determined.

Therefore, for example, the metadata of another object whose metadata has already been determined may also be used as the input of the metadata determination method.

Note that, the information given for each object, the information obtained from the audio signal, and other information such as the number of objects described above may be used independently as the input of the metadata determination method, or those pieces of information may be combined and used as the input of the metadata determination method.

<Modification of Metadata>

By the way, it is possible to determine the metadata of the object by using each type of information described above. However, in 3D Audio content (hereinafter, also simply referred to as content) with a small number of objects, the determined metadata parameters may be unevenly determined in one place. Such an example is shown in FIG. 2.

Figure 2:
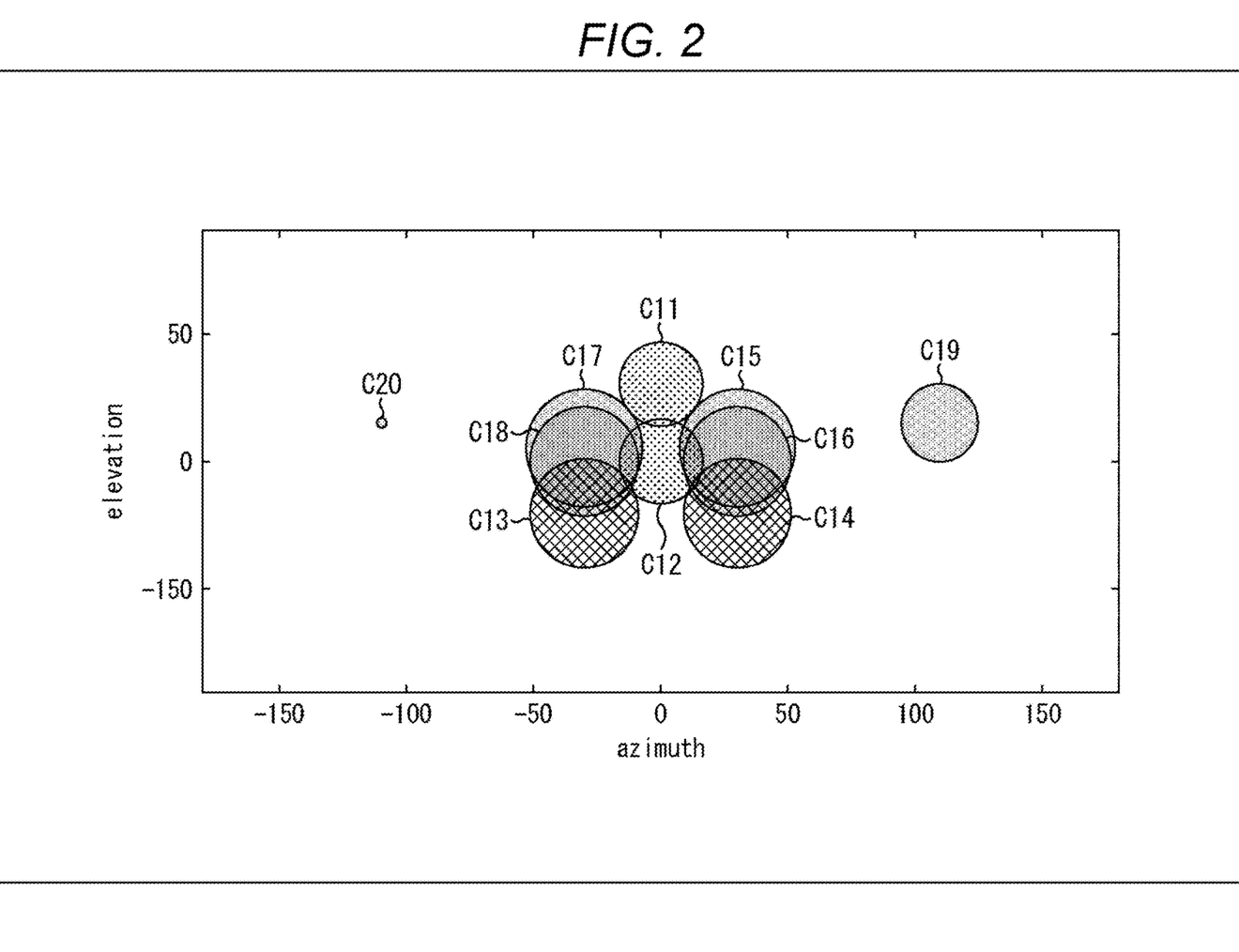
FIG. 2 is a diagram illustrating distribution adjustment of metadata.

In FIG. 2, the horizontal axis shows the horizontal angles that constitute the metadata, and the vertical axis shows the vertical angles that constitute the metadata.

Further, in FIG. 2, one circle indicates one object, and the pattern added to each circle is different for each of pieces of musical instrument information given to the objects corresponding to those circles.

Here, the circles C11 and C12 indicate objects to which the vocal "vocal" is given as musical instrument information, and the circles C13 and C14 indicate objects to which the bass "bass" is given as musical instrument information. Further, the circles C15 to C20 indicate objects to which the piano "piano" is given as musical instrument information.

Each of these circles is arranged at a position determined by the horizontal and vertical angles determined by prediction for the corresponding object. That is, the position of each circle in the horizontal axis direction is the position indicated by the horizontal angle of the object corresponding to each circle, and the position of each circle in the vertical axis direction is the position indicated by the vertical angle of the object corresponding to each circle.

Further, the size of each circle indicates the magnitude (height) of a sound pressure of the audio signal of the object, and the size of the circle is made to increase in proportion to the sound pressure.

Therefore, it can be said that FIG. 2 shows the distribution of the parameters (metadata) of each object in a parameter space (parameter space) centered on the horizontal and vertical angles, and the magnitude of the sound pressure of the object signal of each object.

For example, in a content with a small number of objects, as shown in FIG. 2, only musical instruments that are important in many contents such as vocal, piano, and bass are often included as objects. In the case of a certain producer, the arrangement of these musical instruments tends to be set to the front center position, and as a result, the determined metadata is biased in one place.

In this example, the circles C11 to C18 are concentrated in the center in FIG. 2, and it can be seen that the metadata of the objects corresponding to those circles have close values. In other words, the distribution of the metadata of each object is concentrated at positions close to each other in the parameter space. In such a case, if rendering is performed using the determined metadata as it is, the obtained content will be of low quality without three-dimensional sound direction, distance, and spread.

Therefore, in the present technology, by adjusting the distribution of objects, that is, the distribution of metadata of objects, it is possible to obtain high-quality content with three-dimensional sound direction, distance, and spread.

In the distribution adjustment, the metadata already determined by the input of the producer or the like or the metadata determined by the prediction by the decision tree or the like is used as the input. Therefore, it can be applied independently of the above-mentioned metadata determination method. That is, the distribution of the metadata can be adjusted regardless of the method of determining the metadata.

The distribution of the metadata may be adjusted by either a manual method (hereinafter referred to as a manual adjustment method) or an automatic method (hereinafter referred to as an automatic adjustment method). Each method will be described below.

(Manual Adjustment Method)

First, a manual adjustment method of metadata will be described.

In the manual adjustment method, a predetermined value for addition is added to the value of the parameter of the metadata of the object, a predetermined value for multiplication is multiplied, or both the addition and multiplication are performed, and thus the distribution of the metadata is adjusted.

For example, it is sufficient that the value added by the addition process or the value multiplied by the multiplication process of the manual adjustment method is adjusted by operating a bar or the like on a 3D Audio content production tool of Graphical User Interfac (GUI).

This makes it possible to perform adjustment of widening or narrowing the distribution of all objects, that is, the distribution of metadata while maintaining the positional relationship of objects, and it is possible to easily adjust to the metadata intended by the producer in a short time.

Here, for example, in a case where the distribution of metadata is adjusted only by the addition process, when among the parameters of the metadata, a negative value is added to a parameter having a negative value, and a positive value is added to a parameter having a positive value, it is possible to adjust (correct) the distribution of the metadata to a distribution with a more spatial spread.

Also, for example, in a case where the distribution of metadata is adjusted only by the addition process, by adding the same value to each parameter, it is possible to realize distribution adjustment to translate those objects in space while maintaining the positional relationship of each object.

(Automatic Adjustment Method)

In the automatic adjustment method, each of the objects is considered as a vector represented by the horizontal angle, vertical angle, and distance that constitute the metadata. In the following, a vector having such a horizontal angle, a vertical angle, and a distance as elements will be referred to as an object vector.

In the automatic adjustment method, the mean value of the object vectors of all objects is obtained as an object mean vector.

Then, the difference vector between the object mean vector and each of the object vectors is obtained, and a vector having a mean square value of those difference vectors as an element is obtained. That is, for each of the horizontal angle, the vertical angle, and the distance, a vector having the mean square value of the difference of each value of the object as an element is obtained from the mean value.

The mean square value for each of the horizontal angle, the vertical angle, and the distance thus obtained corresponds to the variance for each of the horizontal angle, the vertical angle, and the distance, and a vector having the mean square value for each of the horizontal angle, the vertical angle, and the distance as an element is called an object variance vector. It can be said that the object variance vector shows the distribution of metadata of a plurality of objects.

Further, the metadata is adjusted so that the object variance vector obtained by the above calculation has a desired value, that is, a target variance value. When adjusting the metadata, one parameter (element) such as a horizontal angle constituting the metadata may be adjusted, or a plurality of parameters may be adjusted. In addition, all the parameters constituting the metadata may be adjusted.

Here, it is sufficient that the desired value that is the target of the object variance vector is obtained, for example, by calculating object variance vectors for a plurality of 3D Audio contents in advance and setting the mean value of the object variance vectors as the target desired value.

Similarly, in the automatic adjustment method, the metadata may be adjusted so that the object mean vector has the target value, or the metadata may be adjusted so that both the object mean vector and the object variance vector have the target values.

In addition, the values of the object mean vector and the object variance vector that are targeted at the time of adjustment in the automatic adjustment method may be obtained in advance by learning, etc. for each genre of 3D Audio content, each producer, and each number of objects of 3D Audio content. By doing so, it is possible to realize distribution adjustment suitable for the genre of the content and distribution adjustment that reflects the uniqueness of the producer.

Further, the sound pressure of each object may be weighted with respect to the object vector. That is, the object vector obtained for an object may be multiplied by a weight corresponding to the sound pressure of the audio signal of the object, and the resultant vector may be used as the final object vector.

In this case, the sound pressure distribution can be a desired value, that is, the target sound pressure distribution, and higher-quality metadata can be adjusted (corrected). This is because audio content with an appropriate sound pressure distribution is considered to be high quality content.

In addition, in the distribution adjustment of the metadata by these manual adjustment method and automatic adjustment method, there may be objects that are not subject to adjustment.

For objects that are not subject to the distribution adjustment, the object metadata is not used to calculate the object mean vector. However, the metadata of the object that is not subject to adjustment may be used in the calculation of the object mean vector.

For example, an object whose musical instrument information is "vocal" is often important in the content, and the quality may be higher if the distribution of metadata is biased in one place. In such a case, the object whose musical instrument information is "vocal" may not be subject to metadata distribution adjustment.

Note that, the object that is not subject to the metadata distribution adjustment may be an object in which the information given to each object such as musical instrument information indicates a predetermined one (value, etc.), or may be an object specified by the producer or the like.

Figure 3:
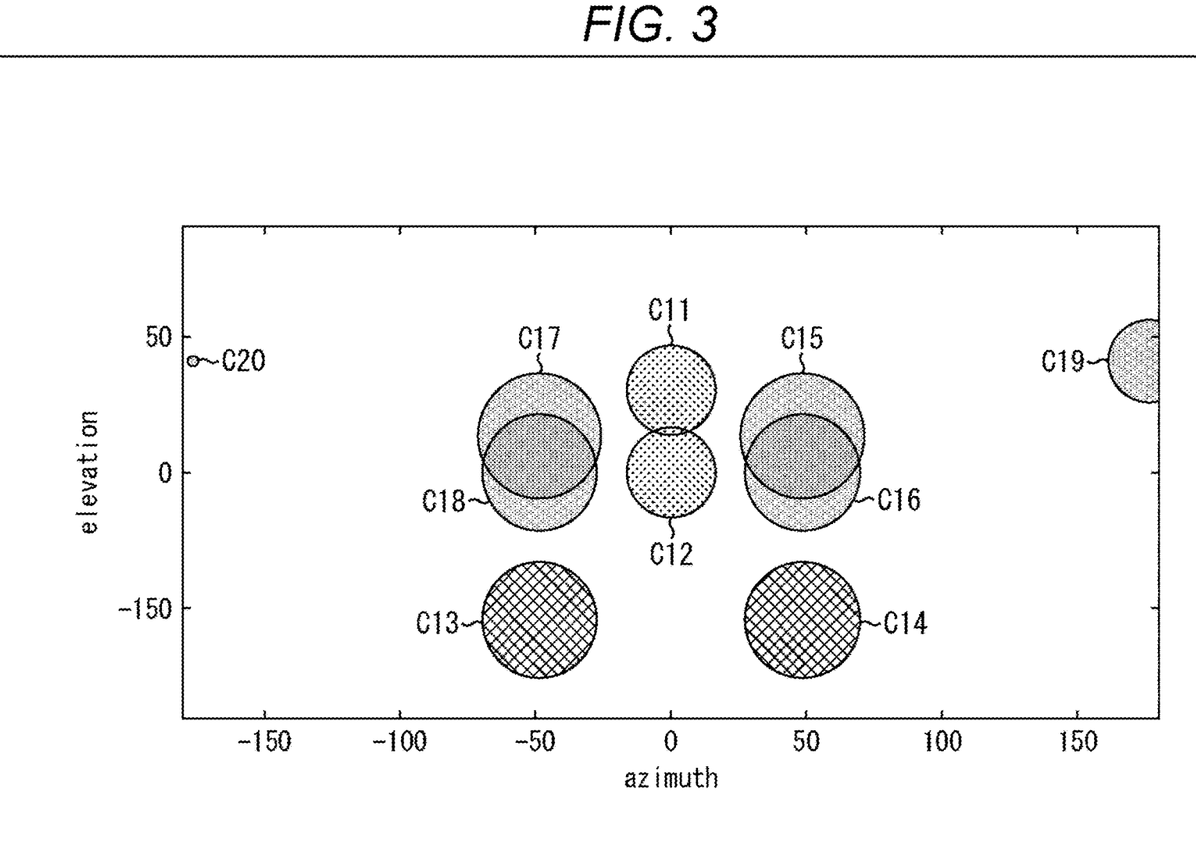
FIG. 3 is a diagram illustrating distribution adjustment of metadata.

By the above distribution adjustment, the distribution shown in FIG. 2 becomes, for example, the one as shown in FIG. 3. Note that, in FIG. 3, the same reference numerals are given to the parts corresponding to those in FIG. 2, and the description thereof will be omitted as appropriate. Further, also in FIG. 3, the horizontal axis indicates the horizontal angle that constitutes the metadata, and the vertical axis indicates the vertical angle that constitutes the metadata.

In the example of FIG. 3, the objects whose musical instrument information is "vocal," that is, the objects indicated by the circles C11 and C12, are not subject to the metadata distribution adjustment.

As shown in FIG. 3, it can be seen that by the metadata distribution adjustment, each object, that is, the metadata of each object is distributed at an appropriate distance from the case shown in FIG. 2. As a result, it is possible to obtain high-quality content with three-dimensional sound direction, distance, and spread.

<Configuration Example of Information Processing Device>

Next, an information processing device that determines metadata by the metadata determination method described above and further adjusts the distribution of the determined metadata will be described.

Figure 4:
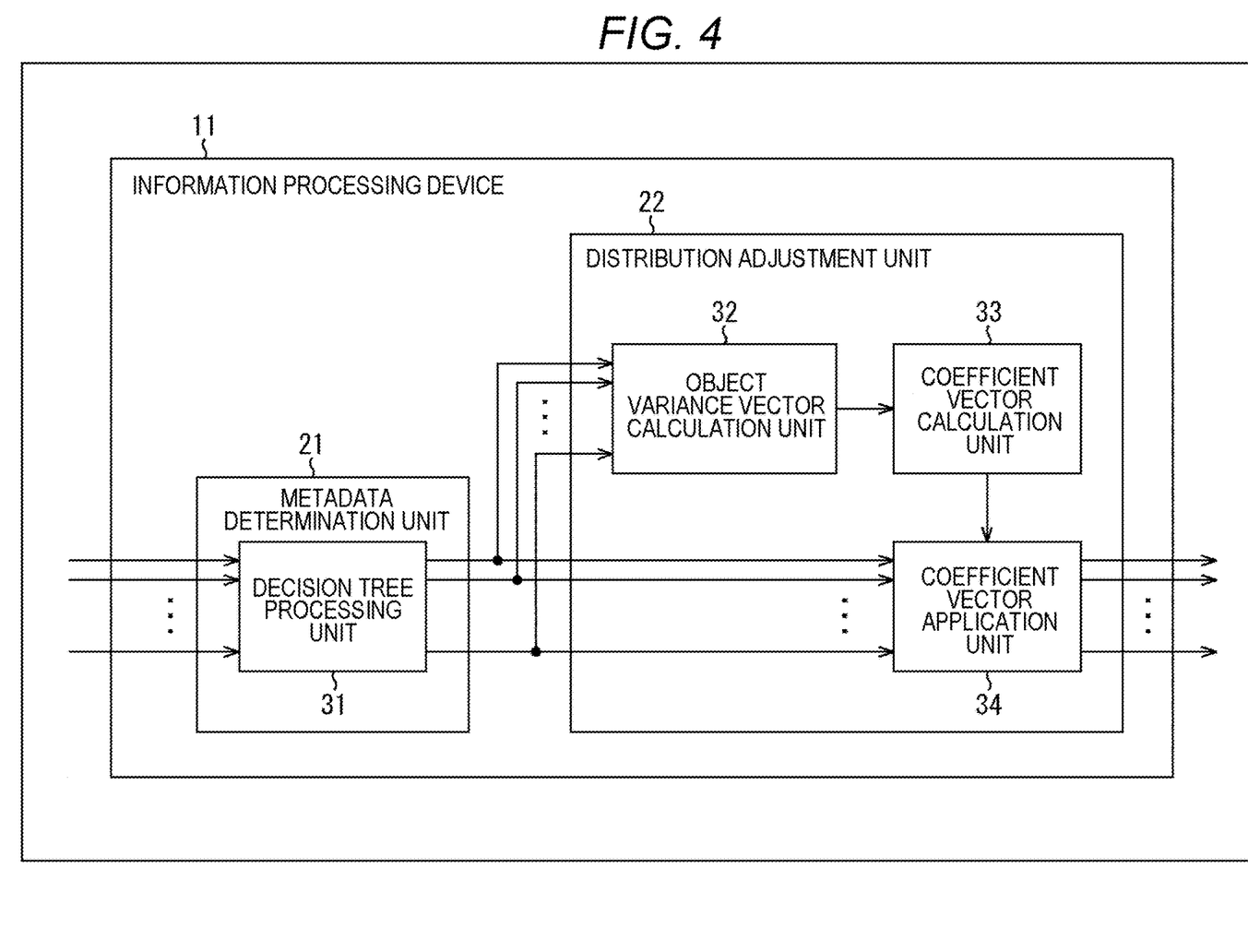
FIG. 4 is a diagram showing a configuration example of an information processing device.

For example, in a case where a method of determining metadata by a decision tree is used as a metadata determination method, the information processing device is configured as shown in FIG. 4.

An information processing device 11 shown in FIG. 4 has a metadata determination unit 21 and a distribution adjustment unit 22.

For each object, the metadata determination unit 21 determines by prediction metadata of each object on the basis of information regarding the attributes of the object supplied from the outside, that is, one or more pieces of attribute information of the object, and outputs the determined metadata. Note that, the number of objects whose metadata is to be determined may be one or more, but here, it is assumed that the metadata is determined for a plurality of objects.

In addition, the object attribute information is at least one of musical instrument information, reverberation information, acoustic information, priority information, channel information, number of objects, metadata of another object, object name, and information indicating a genre. The metadata determination unit 21 is also supplied with an audio signal for calculating a feature amount related to a sound pressure and a pitch as the object attribute information.

Further, the metadata determination unit 21 has a decision tree processing unit 31. The metadata determination unit 21 appropriately calculates the feature amount related to the sound pressure and pitch as the object attribute information on the basis of the audio signal, and inputs the calculated feature amount and the object attribute information supplied from the outside to the decision tree processing unit 31. Note that, one or more pieces of attribute information may be input to the decision tree processing unit 31.

The decision tree processing unit 31 performs a process of determining metadata by the decision tree on the basis of the input object attribute information, and supplies the metadata of each object obtained as a result of the determination to the distribution adjustment unit 22. The decision tree processing unit 31 holds a decision tree (decision tree model) obtained in advance by learning.

Note that, here, an example in which the horizontal angle, the vertical angle, and the distance are determined as the metadata parameters in the decision tree processing unit 31, but the determined parameters may include the gain. Further, any one or more parameters among the plurality of parameters constituting the metadata may be determined by the decision tree processing unit 31.

The distribution adjustment unit 22 performs the above-mentioned distribution adjustment on the metadata of each object of the plurality of objects supplied from the decision tree processing unit 31, and supplies (outputs) the metadata after the distribution adjustment as the final metadata of each object to the latter stage.

The distribution adjustment unit 22 has an object variance vector calculation unit 32, a coefficient vector calculation unit 33, and a coefficient vector application unit 34.

The object variance vector calculation unit 32 uses a vector whose elements are the horizontal angle, the vertical angle, and the distance that constitute the metadata of each object supplied from the decision tree processing unit 31 as an object vector, and calculates an object mean vector on the basis of the object vector of each object. Further, the object variance vector calculation unit 32 calculates an object variance vector on the basis of the calculated object mean vector and each object vector, and supplies the object variance vector to the coefficient vector calculation unit 33.

The coefficient vector calculation unit 33 divides each of the elements of a predetermined value vector having predetermined values obtained in advance for each of the horizontal angle, the vertical angle, and the distance as elements by each of the elements of the object variance vector supplied from the object variance vector calculation unit 32, thereby calculates a coefficient vector having a coefficient as an element for each of the horizontal angle, the vertical angle, and the distance, and supplies the coefficient vector to the coefficient vector application unit 34.

Here, the predetermined value vector obtained in advance is a target object variance vector, and is obtained by learning, etc. for each genre or each producer, for example. Specifically, for example, the value of the target object variance vector is a vector having the mean value of each element of the object variance vector obtained for a plurality of 3D Audio contents of the same genre as an element.

The coefficient vector application unit 34 calculates the metadata after distribution adjustment by multiplying the metadata supplied from the decision tree processing unit 31 by the coefficient vector supplied from the coefficient vector calculation unit 33 for each element, and outputs the obtained metadata to the latter stage. In the coefficient vector application unit 34, the distribution of the metadata is adjusted by multiplying the metadata by the coefficient vector for each element. As a result, the distribution of the metadata becomes the distribution corresponding to the target object variance vector.

For example, in the latter stage of the coefficient vector application unit 34, the rendering process is performed on the basis of the audio signal and the metadata of each object, and the metadata is adjusted manually by the producer.

Note that, the decision tree processing unit 31 may supply the object variance vector calculation unit 32 and the coefficient vector application unit 34 with not only metadata but also object attribute information such as musical instrument information, an object that is not subject to distribution adjustment may be determined on the basis of the object attribute information. In this case, the distribution of the metadata is not adjusted for the object that is not subject to distribution adjustment, and the metadata determined by the decision tree processing unit 31 is output as it is as the final metadata.

Further, as the distribution adjustment of the metadata, the object mean vector may be adjusted, or both the object variance vector and the object mean vector may be adjusted. Further, here, an example in which the distribution adjustment unit 22 performs the distribution adjustment by the automatic adjustment method has been described, but in the distribution adjustment unit 22, the distribution adjustment may be performed by the manual adjustment method according to the input of the producer or the like.

In such a case, for example, the distribution adjustment unit 22 adds or multiplies a predetermined value specified by the producer or the like to or by the metadata of the object, performs an operation based on the predetermined value and the metadata to obtain the metadata after distribution adjustment. Further, even in this case, the object specified by the producer or the object determined by the object attribute information or the like may not be subject to the distribution adjustment.

<Explanation of Metadata Determination Process>

Subsequently, the operation of the information processing device 11 shown in FIG. 4 will be described. That is, the metadata determination process by the information processing device 11 will be described below with reference to the flowchart of FIG. 5.

Figure 5:
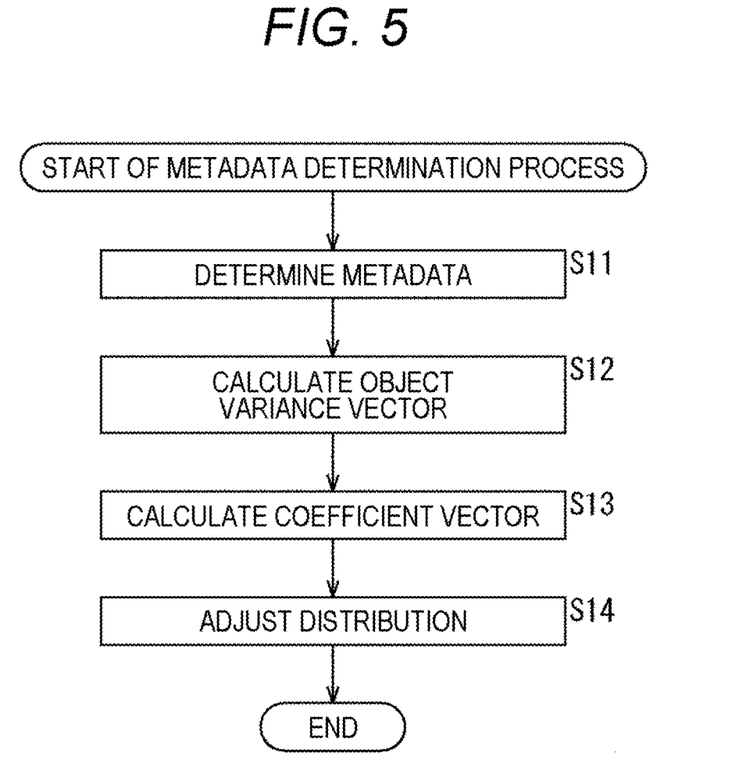
FIG. 5 is a flowchart illustrating a metadata determination process.

In step S11, the decision tree processing unit 31 determines the metadata on the basis of the object attribute information, and supplies the determination result to the object variance vector calculation unit 32 and the coefficient vector application unit 34.

That is, the metadata determination unit 21 calculates the feature amounts of sound pressure and pitch by calculating the above-mentioned formulae (1) and (2) on the basis of the audio signals supplied as needed. Then, the metadata determination unit 21 inputs the calculated feature amounts, the musical instrument information supplied from the outside, and the like to the decision tree processing unit 31 as the object attribute information.

The decision tree processing unit 31 determines metadata by the decision tree on the basis of the supplied object attribute information. Further, the metadata determination unit 21 also supplies the object attribute information to the object variance vector calculation unit 32 and the coefficient vector application unit 34 as needed.

In step S12, the object variance vector calculation unit 32 obtains the object mean vector on the basis of each object metadata supplied from the decision tree processing unit 31, calculates the object variance vector from the object mean vector and the object vector, and supplies the object variance vector to the coefficient vector calculation unit 33.

In step S13, the coefficient vector calculation unit 33 calculates a coefficient vector by dividing a vector having predetermined values obtained in advance for each of the horizontal angle, the vertical angle, and the distance as elements, that is, a target object variance vector obtained in advance by the object variance vector supplied from the object variance vector calculation unit 32 for each element, and supplies the coefficient vector to the coefficient vector application unit 34.

In step S14, the coefficient vector application unit 34 adjusts the distribution of the metadata supplied from the decision tree processing unit 31 on the basis of the coefficient vector supplied from the coefficient vector calculation unit 33, and outputs the resultant metadata after the distribution adjustment to terminate the metadata determination process.

For example, the coefficient vector application unit 34 adjusts the distribution of the metadata by multiplying the metadata by the coefficient vector for each element. Note that, as described above, the predetermined object may not be subject to the distribution adjustment of the metadata.

As described above, the information processing device 11 determines the metadata of each object on the basis of the object attribute information, and adjusts the distribution of the metadata. By doing so, the producer does not have to specify (input) the metadata of each object each time, so that it becomes possible to easily produce high-quality 3D Audio content in a short time.

<About Learning of Decision Tree>

By the way, although the metadata can be determined by the above-mentioned method, it is preferable that the determination pattern, that is, the decision tree or the like used for determining the metadata is not one but a plurality. This is because it is difficult to handle a wide variety of contents with one determination pattern (decision tree, etc.), and it becomes possible to produce higher-quality 3D Audio content by making it possible to select the most suitable one for the producer from a plurality of determination patterns.

As described above, since the determination of metadata is based on learning data, it becomes possible to perform determination with a plurality of patterns by dividing the learning data into a plurality of pieces of data, and performing learning of a decision tree model using each piece of the divided learning data. At this time, the advantages differ depending on how the learning data is divided.

Specifically, for example, if the learning data is divided for each producer, the accuracy of determining the metadata for each producer can be improved. That is, it becomes possible to obtain a decision tree (decision tree model) for determining metadata that more reflects the characteristics of the producer.

The characteristics of the producer are one of the most important factors in determining the quality of the content, and by dividing the learning data for each producer, it is possible to increase the variation in quality with the determination pattern. In addition, by using the data produced by the producer himself/herself as learning data, it is possible to make a determination that more reflects the characteristics of the producer in the past, and it is possible to shorten the production time.

In such a case, for example, if a decision tree is learned and prepared for each producer of a plurality of producers, a general user or the like can select a decision tree of his/her favorite producer from among the decision trees of the respective producers of the plurality of producers, and can determine the metadata using the selected decision tree. As a result, it becomes possible to obtain content that reflects the characteristics of his/her favorite producer.

Further, for example, if the learning data is divided according to the genre (kind) of the content such as rock, pop, and classic, the accuracy of determining the metadata can be improved. That is, if the decision tree is learned for each content genre, metadata suitable for the content genre can be obtained.

Further, as described above, the target values of the object mean vector and the object variance vector used for adjusting the distribution of metadata can be also obtained by learning or the like for each genre, each producer, and each number of objects constituting the content.

As described above, according to the present technology, high-quality 3D Audio content can be produced in a short time by determining metadata on the basis of the object attribute information and performing distribution adjustment on the determined result.

Note that, the present technology can be applied, even in a case where the position of each object in space is always the same regardless of time, that is, the object does not move, or the position of the object in space changes with time.

In a case where the position of the object changes, for example, it is sufficient that the metadata determination process described with reference to FIG. 5 is performed for each time, and the metadata between the two times is obtained by interpolation processing or the like as necessary.

<Computer Configuration Example>

By the way, a series of processes described above can be executed by hardware or software. In a case where a series of processes is executed by software, programs that constitute the software are installed on a computer. Here, the computer includes a computer embedded in dedicated hardware and, for example, a general-purpose personal computer capable of executing various functions by installing various programs.

Figure 6:
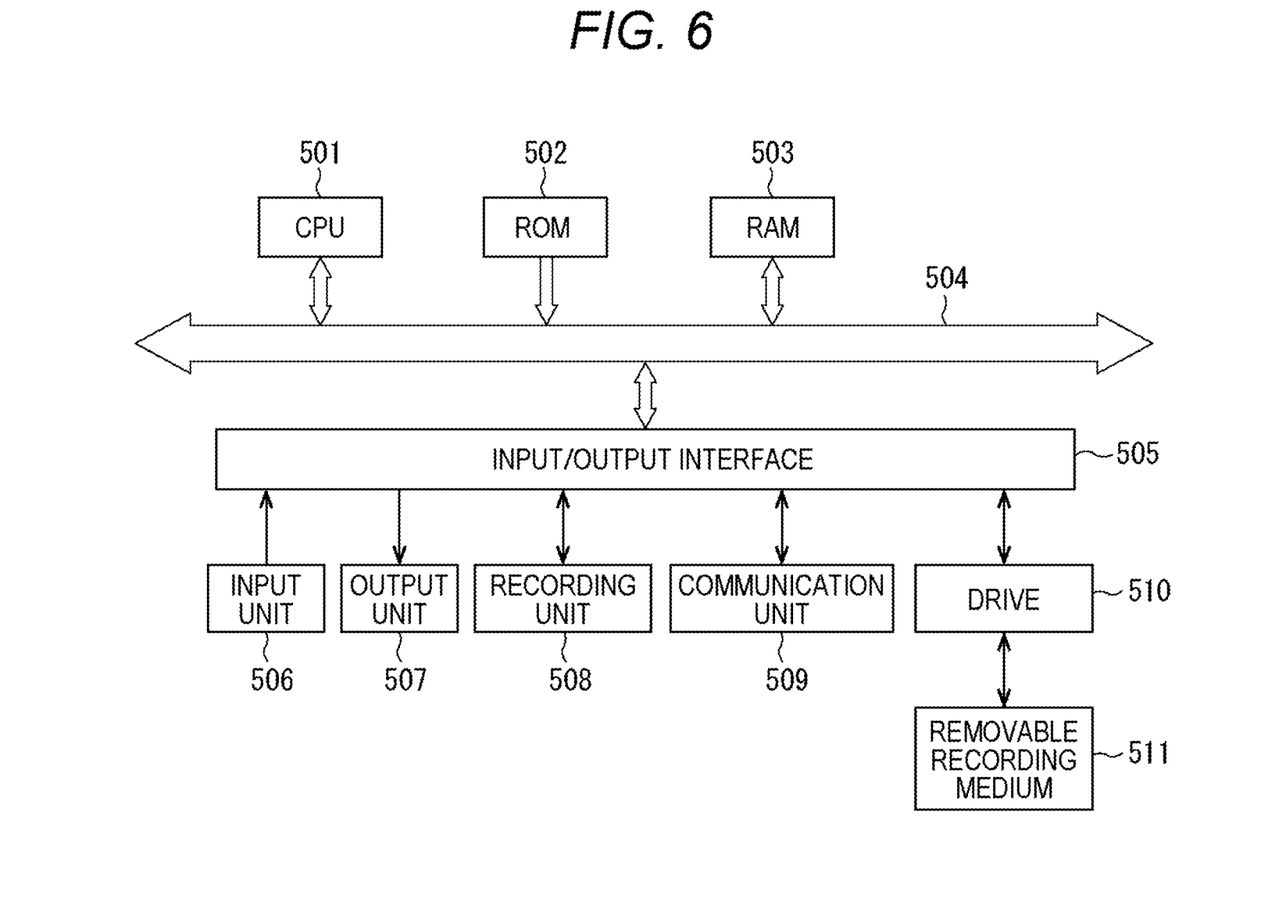
FIG. 6 is a diagram showing a configuration example of a computer.

FIG. 6 is a block diagram showing a configuration example of the hardware of a computer that executes the above-mentioned series of processes according to the programs.

In the computer, a Central Processing Unit (CPU) 501, a Read Only Memory (ROM) 502, and a Random Access Memory (RAM) 503 are connected to each other by a bus 504.

An input/output interface 505 is further connected to the bus 504. An input unit 506, an output unit 507, a recording unit 508, a communication unit 509, and a drive 510 are connected to the input/output interface 505.

The input unit 506 includes a keyboard, a mouse, a microphone, an image sensor, and the like. The output unit 507 includes a display, a speaker, and the like. The recording unit 508 includes a hard disk, a non-volatile memory, or the like. The communication unit 509 includes a network interface or the like. The drive 510 drives a removable recording medium 511 such as a magnetic disk, an optical disk, a magneto-optical disk, or a semiconductor memory.

In the computer configured as described above, the CPU 501 loads the program recorded in the recording unit 508 into the RAM 503 via the input/output interface 505 and the bus 504 and executes the program, thereby performing the above-described series of processes, for example.

The program executed by the computer (CPU 501) can be provided by being recorded in the removable recording medium 511 as a package medium or the like, for example. Further, the program can be provided via a wired or wireless transmission medium such as a local area network, the Internet, or digital satellite broadcasting.

In the computer, the program can be installed in the recording unit 508 via the input/output interface 505 by mounting the removable recording medium 511 in the drive 510. Further, the program can be received by the communication unit 509 via a wired or wireless transmission medium and installed in the recording unit 508. In addition, the program can be installed in the ROM 502 or the recording unit 508 in advance.

The program executed by the computer may be a program by which processing is performed in time series in the order described in this specification, or a program by which processing is performed in parallel or at a necessary timing such as when a call is made.

Further, the embodiment of the present technology is not limited to the above-described embodiment, and various changes can be made without departing from the gist of the present technology.

For example, the present technology can be configured as cloud computing in which one function is shared by a plurality of devices via a network and jointly processed.

Further, each step described in the above-described flowchart can be executed by one device or shared and executed by a plurality of devices.

Furthermore, in a case where one step includes a plurality of processes, the plurality of processes included in the one step can be executed by one device or shared and executed by a plurality of devices.

Further, the present technology can be also configured as follows.

(1)

An information processing device including a determination unit that determines one or more parameters constituting the metadata of an object on the basis of one or more pieces of attribute information of the object.

(2)

The information processing device according to (1), in which the parameter is position information indicating the position of the object.

(3)

The information processing device according to (1) or (2), in which the parameter is a gain of an audio signal of the object.

(4)

The information processing device according to any one of (1) to (3), in which the attribute information is information indicating a type of the object.

(5)

The information processing device according to any one of (1) to (4), in which the attribute information is priority information indicating a priority of the object.

(6)

The information processing device according to any one of (1) to (5), in which the object is an audio object.

(7)

The information processing device according to (6), in which the attribute information is information indicating a sound source kind of the object.

(8)

The information processing device according to (7), in which the sound source kind is information indicating a musical instrument, a voice part, or a gender of a voice.

(9)

The information processing device according to any one of (6) to (8), in which the attribute information is information indicating an acoustic effect applied to the audio signal of the object.

(10)

The information processing device according to (9), in which the acoustic effect is a reverberation effect.

(11)

The information processing device according to any one of (6) to (10), in which the attribute information is information regarding a sound pressure or a pitch of the audio signal of the object.

(12)

The information processing device according to any one of (6) to (11), in which the attribute information is information regarding an attribute of content constituted by the object.

(13)

The information processing device according to (12), in which the information regarding the attribute of the content is a genre of the content or the number of the objects constituting the content.

(14)

The information processing device according to any one of (1) to (13), further including a distribution adjustment unit that adjusts distribution of the parameters of a plurality of the objects.

(15)

The information processing device according to (14), in which the distribution adjustment unit adjusts the distribution by adjusting variance or mean of the parameters.

(16)

The information processing device according to (15), in which the distribution adjustment unit adjusts the distribution so that the variance or the mean of the parameters is a value determined for the number of objects constituting the content, a content producer, or the genre of the content.

(17)

The information processing device according to any one of (1) to (16), in which the determination unit determines the parameter by a decision tree that inputs the attribute information and outputs the parameter.

(18)

The information processing device according to (17), in which the decision tree is learned for each genre of content constituted by the object or for each content producer.

(19)

An information processing method including, by an information processing device, determining one or more parameters that constitute metadata of an object on the basis of one or more pieces of attribute information of the object.

(20)

A program that causes a computer to execute processing including a step of determining one or more parameters that constitute metadata of an object on the basis of one or more pieces of attribute information of the object.

REFERENCE SIGNS LIST

11 Information processing device
21 Metadata determination unit
22 Distribution adjustment unit
31 Decision tree processing unit
32 Object variance vector calculation unit
33 Coefficient vector calculation unit
34 Coefficient vector application unit

The invention claimed is:

1. An information processing device, comprising circuitry configured to determine one or more parameters constituting metadata of an audio object on a basis of one or more pieces of attribute information of the audio object; and adjust a distribution of the parameters of a plurality of audio objects, wherein adjusting includes:

calculating an object mean vector for the plurality of audio objects, calculating, for each audio object, an object variance vector based on the object mean vector and an object vector, calculating, for each audio object, a coefficient vector based on a target object variance vector and the calculated object variance vector, and adjusting, for each audio object, the distribution of the metadata based on the coefficient vector.

2. The information processing device according to claim 1, wherein the one or more parameters includes position information indicating a position of the audio object.

3. The information processing device according to claim 1, wherein the one or more parameters includes a gain of an audio signal of the audio object.

4. The information processing device according to claim 1, wherein the attribute information includes information indicating a type of the audio object.

5. The information processing device according to claim 1, wherein the attribute information includes priority information indicating a priority of the audio object.

6. The information processing device according to claim 1, wherein the sound source kind is information indicating a musical instrument, a voice part, or a gender of a voice.

7. The information processing device according to claim 1, wherein the attribute information includes information indicating an acoustic effect applied to an audio signal of the audio object.

8. The information processing device according to claim 7, wherein the acoustic effect includes a reverberation effect.

9. The information processing device according to claim 1, wherein the attribute information includes information regarding a sound pressure or a pitch of an audio signal of the audio object.

10. The information processing device according to claim 1, wherein the attribute information includes information regarding an attribute of a content constituted by the audio object.

11. The information processing device according to claim 10, wherein the information regarding the attribute of the content includes a genre of the content or the number of the audio objects constituting the content.

12. The information processing device according to claim 1, wherein the circuitry is configured to adjust the distribution by adjusting variance or a mean of the parameters.

13. The information processing device according to claim 12, wherein
the circuitry is configured to adjust the distribution so that the variance or the mean of the parameters includes a value determined for the number of audio objects constituting the content, a content producer, or a genre of the content.

14. The information processing device according to claim 1, wherein
the circuitry is configured to determine the parameter by a decision tree that inputs the attribute information and outputs the parameter.

15. The information processing device according to claim 14, wherein
the decision tree is learned for each genre of content constituted by the audio object or for each content producer.

16. An information processing method comprising,
by an information processing device,
determining one or more parameters that constitute metadata of an audio object on a basis of one or more pieces of attribute information of the audio object; and
adjusting a distribution of the parameters of a plurality of audio objects, wherein adjusting includes:
calculating an object mean vector for the plurality of audio objects,
calculating, for each audio object, an object variance vector based on the object mean vector and an object vector,
calculating, for each audio object, a coefficient vector based on a target object variance vector and the calculated object variance vector, and
adjusting, for each audio object, the distribution of the metadata based on the coefficient vector.

17. A non-volatile computer readable medium storing instructions that, when executed by a computer, cause the computer to execute processing comprising:
determining one or more parameters that constitute metadata of an audio object on a basis of one or more pieces of attribute information of the audio object; and
adjusting a distribution of the parameters of a plurality of audio objects, wherein adjusting includes:
calculating an object mean vector for the plurality of audio objects,
calculating, for each audio object, an object variance vector based on the object mean vector and an object vector,
calculating, for each audio object, a coefficient vector based on a target object variance vector and the calculated object variance vector, and
adjusting, for each audio object, the distribution of the metadata based on the coefficient vector.

* * * * *